US011301479B2

(12) United States Patent
Rakshit et al.

(10) Patent No.: US 11,301,479 B2
(45) Date of Patent: Apr. 12, 2022

(54) SERVICE PROVIDER SELECTION FOR QUERIES SENT TO A DIGITAL ASSISTANT

(71) Applicant: International Business Machines Corporation, Armonk, NY (US)

(72) Inventors: Sarbajit K. Rakshit, Kolkata (IN); Martin G. Keen, Cary, NC (US); James E. Bostick, Cedar Park, TX (US); John M. Ganci, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 16/425,995

(22) Filed: May 30, 2019

(65) Prior Publication Data

US 2020/0380002 A1 Dec. 3, 2020

(51) Int. Cl.
*G06F 16/2457* (2019.01)
*G10L 15/18* (2013.01)
*G06Q 30/06* (2012.01)

(52) U.S. Cl.
CPC ... *G06F 16/24575* (2019.01); *G06Q 30/0625* (2013.01); *G10L 15/1822* (2013.01)

(58) Field of Classification Search
CPC ............ G06F 16/958; G06F 16/24575; G06Q 30/0625; G10L 15/1822
See application file for complete search history.

(56) References Cited

U.S. PATENT DOCUMENTS

| 9,892,208 | B2 | 2/2018 | Anastasakos | |
|---|---|---|---|---|
| 2013/0268411 | A1* | 10/2013 | Crafts | G06Q 30/0625 |
| | | | | 705/26.62 |
| 2015/0242928 | A1* | 8/2015 | Gabbai | G06Q 30/0631 |
| | | | | 705/26.62 |
| 2016/0335618 | A1* | 11/2016 | Koh | G06Q 20/105 |
| 2017/0139720 | A1 | 5/2017 | Stein | |
| 2017/0161439 | A1* | 6/2017 | Raduchel | H04W 12/06 |
| 2017/0178626 | A1 | 6/2017 | Gruber | |
| 2017/0242658 | A1 | 8/2017 | Kohlmeier | |
| 2017/0249378 | A1 | 8/2017 | Kasterstein | |
| 2018/0047089 | A1* | 2/2018 | Yang | G06Q 20/40 |
| 2018/0190274 | A1 | 7/2018 | Kirazci | |
| 2018/0247648 | A1* | 8/2018 | Nadimpalli | G06F 15/76 |
| 2019/0295544 | A1* | 9/2019 | Garcia | G10L 25/78 |
| 2020/0120144 | A1* | 4/2020 | Yadav | H04L 63/104 |

OTHER PUBLICATIONS

"Alexa, what are your top skills?", Alexa Skills, Amazon com, downloaded from the internet on Jan. 23, 2019, 4 pages, <https://www.amazon.com/b?node= 13727921011 >.
"SiriKit", Apple Developer, downloaded from the internet on Jan. 23, 2019, 7 pages, <https://developer.apple.com/sirikit/>.

\* cited by examiner

*Primary Examiner* — Etienne P Leroux

(74) *Attorney, Agent, or Firm* — David B. Woycechowsky

(57) ABSTRACT

A digital assistant that uses machine logic to choose among and between online services providers that provide various types of services, such as online ordering of physical goods, online ordering of entertainment content, online education, cloud computing services, online gaming services, news services, weather prediction services and payment services. This choice of service provider may be based upon terms and conditions under which each respective provider provides its service and/or historical data that user(s) have had with each respective service provider in the past.

3 Claims, 5 Drawing Sheets

SERVICE PROVIDER SELECTION FOR QUERIES SENT TO A DIGITAL ASSISTANT

BACKGROUND

The present invention relates generally to the field of digital assistants, and more particularly to the manner in which digital assistants connect users with third party services (for example, payment services, streaming video services, etc.).

Digital assistants are systems that run on devices such as smart phones, smart watches, and smart speakers. Examples of digital assistants include Apple Ski, Google Assistant, and Amazon Alexa. These digital assistants have been expanded to incorporate capabilities of third party apps and services providers. These third party services are typically invoked when the user requests the service by name to the digital assistant. For example, to initiate a mobile payment using MyPayApp the user must specifically identify MyPatApp in her query by actually using (for example, speaking) the word "MyPatApp."

SUMMARY

According to an aspect of the present invention, there is a method, computer program product and/or computer system that performs the following operations (not necessarily in the following order): (i) receiving a third party services data set including information indicative of: (a) identities of a plurality of online providers of services of a first type, and (b) for each given online provider of the plurality of online providers, information relating to how the given online provider provides services of the first type; (ii) receiving, by a digital assistant and from a first user, a first query requesting services of the first type; (iii) responsive to the receipt of the first query, selecting, by machine logic, a selected online provider from the plurality of online providers based, at least in part, on the third party services data set; and (iv) taking, by machine logic, an action that facilitates provision of services of the first type by the selected online provider and to the first user.

DETAILED DESCRIPTION

Figure 1:
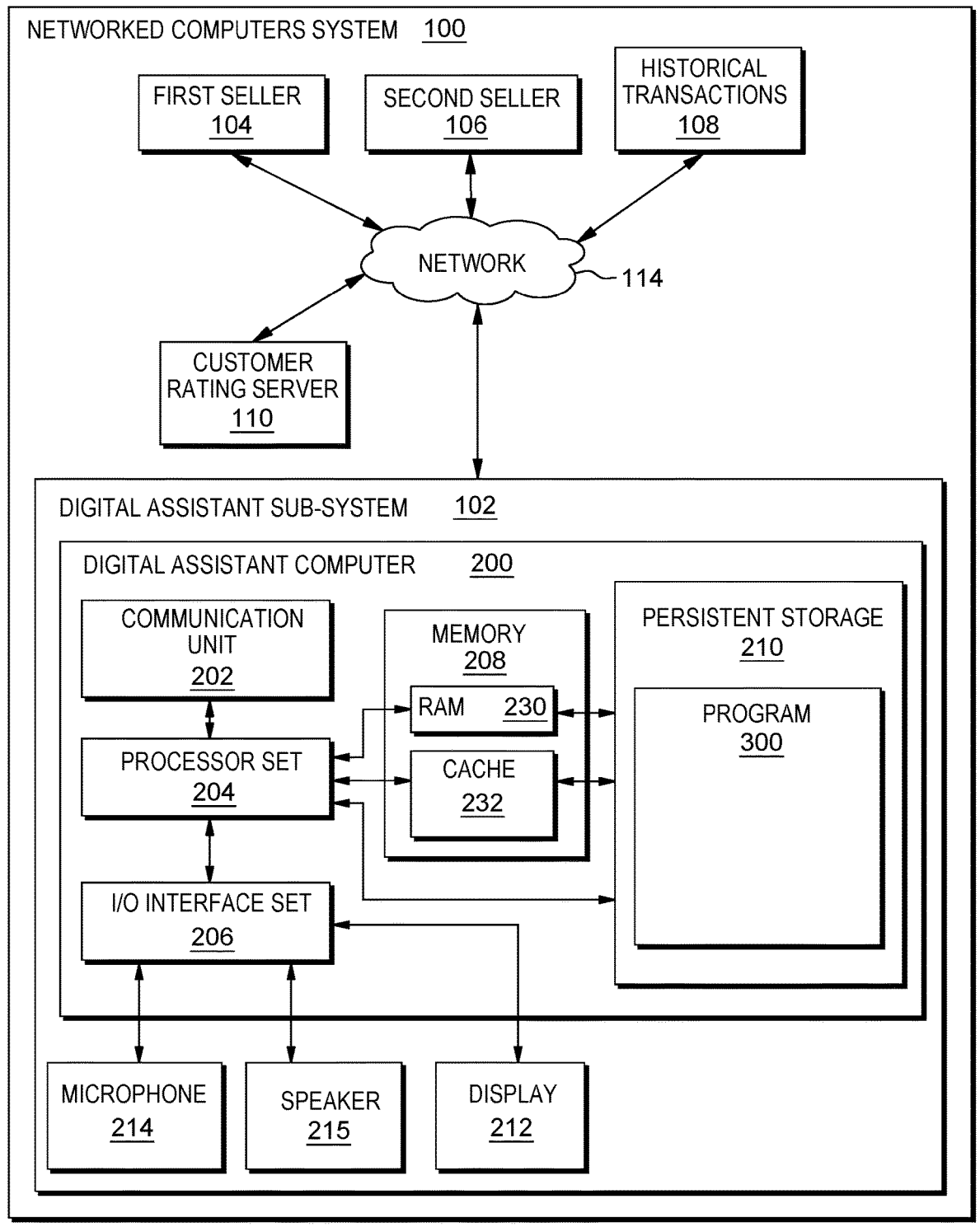
FIG. 1 is a block diagram view of a first embodiment of a system according to the present invention.

Some embodiments of the present invention are directed to a digital assistant that uses machine logic to choose among and between online services providers that provide various types of services, such as online ordering of physical goods, online ordering of entertainment content, online education, cloud computing services, online gaming services, news services, weather prediction services and payment services. This choice of service provider may be based upon terms and conditions under which each respective provider provides its service and/or historical data that user(s) have had with each respective service provider in the past.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: digital assistant sub-system 102; first seller subsystem 104; second seller subsystem 106; historical transaction subsystem 108; customer rating server 110; communication network 114; digital assistant computer 200; communication unit 202; processor set 204; input/output (I/O) interface set 206; memory device 208; persistent storage device 210; display device 212; microphone 214; speaker 215; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to microphone 214 and speaker 215. Other possible external devices may include a keyboard, keypad, a touch screen, portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
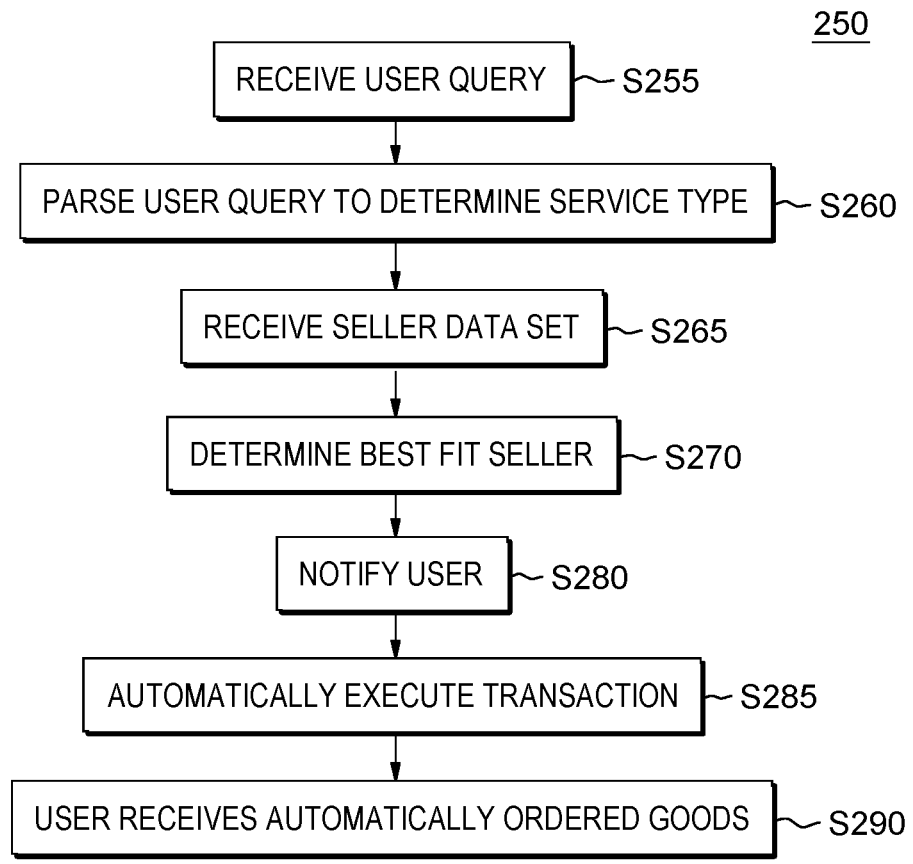
FIG. 2 is a flowchart showing a first embodiment method performed, at least in part, by the first embodiment system.
Figure 3:
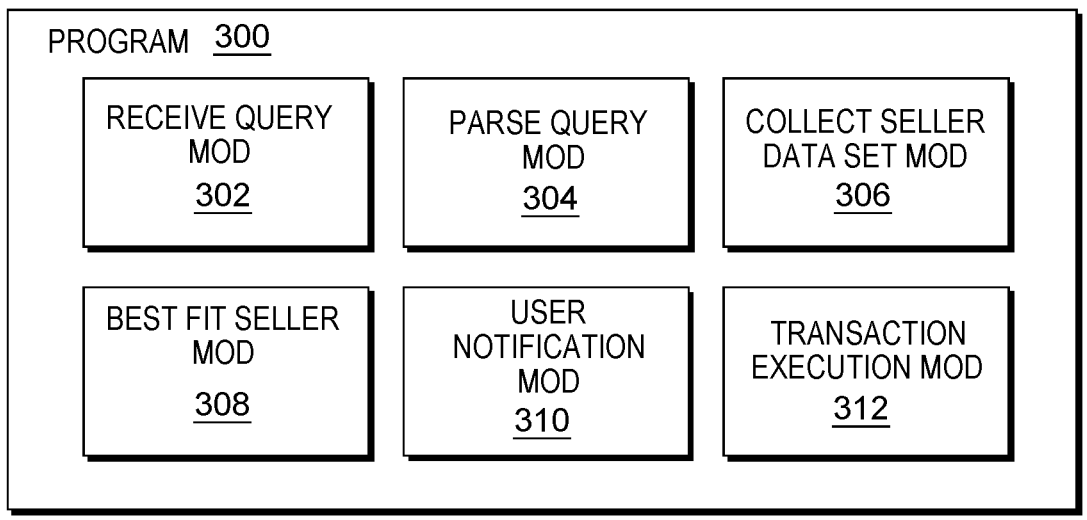
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Figure 4:
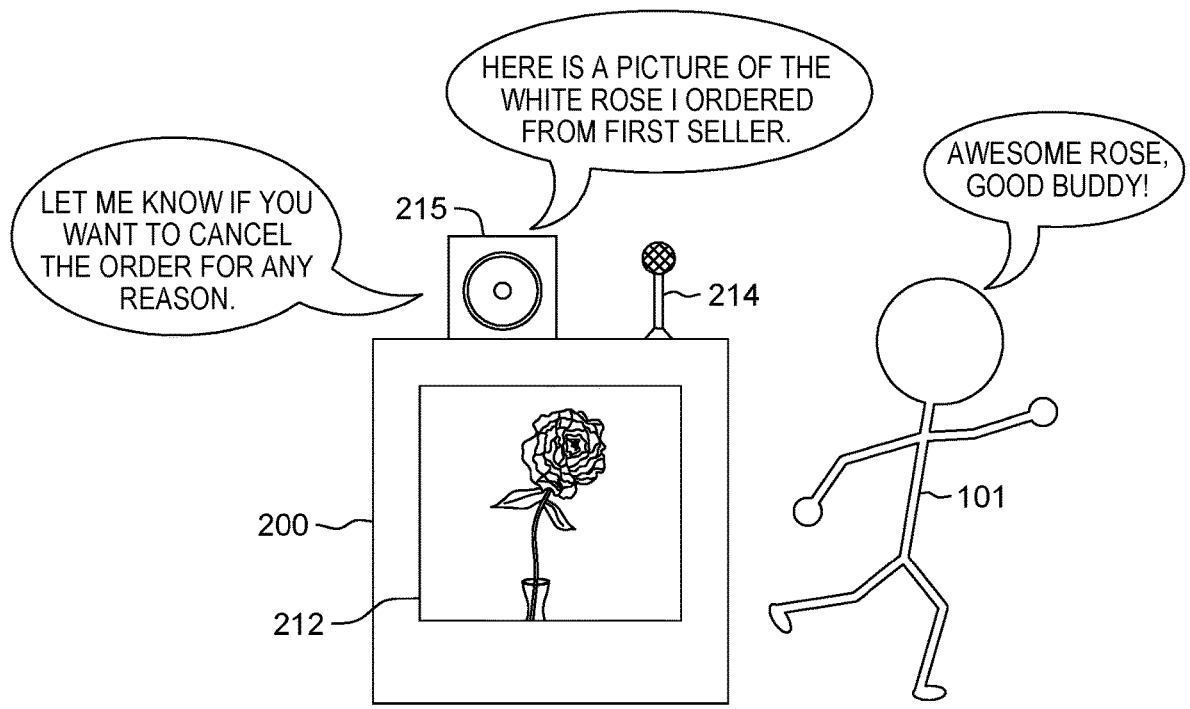
FIG. 4 is a front side view of a portion of the first embodiment system.

Processing begins at operation S255, where received query module (mod) 302 receives a user query through microphone 214 from user 101 (see FIG. 4). More particularly, in this example, user 101 says, "I would like to buy a single white rose."

Processing proceeds to operation S260, where parse query mod 304 converts the user's spoken input into computer readable data and determines that user 101 wishes to purchase a single white rose over the Internet and have it delivered to her.

Processing proceeds to operation S265, where collect seller data set 306 collects data relevant to the purchase of a single white rose from first seller subsystem 104 and second seller subsystem 106 through communication network 114 (see FIG. 1). In this simple example, the seller data set is limited to the availability of white roses from the first seller and the second seller. Other types of seller data can also be collected, such as seller data relating to historical transactions (see historical transactions subsystem 108 in FIG. 1) and customer ratings of the seller (see customer rating server 110 in FIG. 1). Other types of provider related data are identified in the following subsection of this Detailed Description section.

Processing proceeds to operation S270, where best fit seller mod 308 determines which online services provider, the first seller or the second seller, can provide the single white rose that best fits the wants and needs of user 101. In this simple example, only price is considered. Best fit seller mod 308 is programmed to figure out that a single white rose is a luxury good, and, therefore, user 101 will want the most expensive single white rose as a way to try to maximize quality of the single white rose. In this example, the first seller is chosen because the first seller has the most expensive white rose. Other parameters related to the provision of the service can be considered, such as ease of access, security, customer satisfaction rating, delivery schedule, payment terms, quantity/length of time terms, and/or whether the first user has an account with the given online service. Also, alternatively, other embodiments of the present invention may apply to other types of online service providers such as online ordering of entertainment content, online education, cloud computing services, online gaming services, news services, weather prediction services and/or payment services.

Processing proceeds to operation S280, where user notification mod 310 notifies user 101, through speaker 215, that a single white rose is going to be ordered from the first seller and also displays a photograph of the first seller's white rose on display 212 (see FIG. 4).

Processing proceeds to operation S285, where transaction execution mod 312 automatically orders purchase and delivery of a single white rose from first seller subsystem 104 over communication network 114.

III. Further Comments and/or Embodiments

Some embodiments of the present invention recognize the following facts, potential problems and/or potential areas for improvement with respect to the current state of the art: (i) while a user may be enrolled in services (for example, payment services other than a particular one specified in a given user query that could have equally fulfilled a given request, the digital assistant relies on the user specifying the service (for example, MyPayApp in the case of payment services) to use by name; and/or (ii) while a user may be enrolled in services (for example, payment services other than a particular one specified in a given user query that could have equally fulfilled a given request, the digital assistant relies on the user setting a default provider ("send all mobile payments using MyPayApp").

Some embodiments of the present invention may include one, or more, of the following operations, features, characteristics and/or advantages: (i) service provider selection for queries sent to a digital assistant; (ii) a method related to a digital assistant (for example, Apple Siri, Google Assistant, Amazon Alexa) selecting the most appropriate service provider to fulfill a user query; (iii) a system that analyzes user queries issued to a digital assistant to derive the most appropriate service to fulfill the request based upon personal and aggregate usage history, personal and aggregate review history, and service capabilities for the given query; and/or (iv) a digital assistant that selects the most suitable service provider to fulfill a user query and informs the user of the service selected and reason for selection.

Some embodiments of the present invention analyze user requests to a digital assistant, derives the services that can fulfill the request, then picks the service most applicable to the user's situation. The following paragraphs discuss example(s) of user requests to a digital assistant that may be handled by some embodiments of the present invention.

"Get me a ride to SFO" could be fulfilled by TransportServiceA or TransportServiceB. In this example, the user has accounts with both transport service providers. A cost benefit analysis shows TransportServiceA is cheaper but has a 25 minute wait, while TransportServiceB is marginally more expensive but ready in 2 minutes. Accordingly, TransportProviderB is chosen for the transport task.

"Send a message to Jimmy" could be fulfilled by MessageServiceA, MessageServiceB or MessageServiceC. The user and Jimmy both have accounts on all three services. However, Jimmy is most active on MessageServiceB, so this service is chosen to fulfill the request.

"Watch Abel's Variety Hour Season 3 Episode 2" could be fulfilled by streaming video entertainment content providers A or B. The user has a subscription to both. Provider A has the episode in 4K and Provider B only in 1080p. According, Provider A is selected to fulfill the request.

"How is Johnny Hockeyplayer doing?" could be fulfilled by multiple sports services. The user typically reads NHL (National Hockey League) news on a web site provided by Johnny Hockeyplayer's team. Therefore, this request is fulfilled by reference to the website provided by Johnny Hockeyplayer's team.

Some embodiments of the present invention may include one, or more, of the following features, characteristics and/or advantages: (i) analyzes user queries issued to a digital assistant to derive the most appropriate service to fulfill the request based upon personal and aggregate usage history, personal and aggregate review history, and service capabilities for the given query; and/or (ii) a digital assistant that selects the most suitable service provider to fulfill a user query and informs the user of the service selected and reason for selection.

Figure 5:
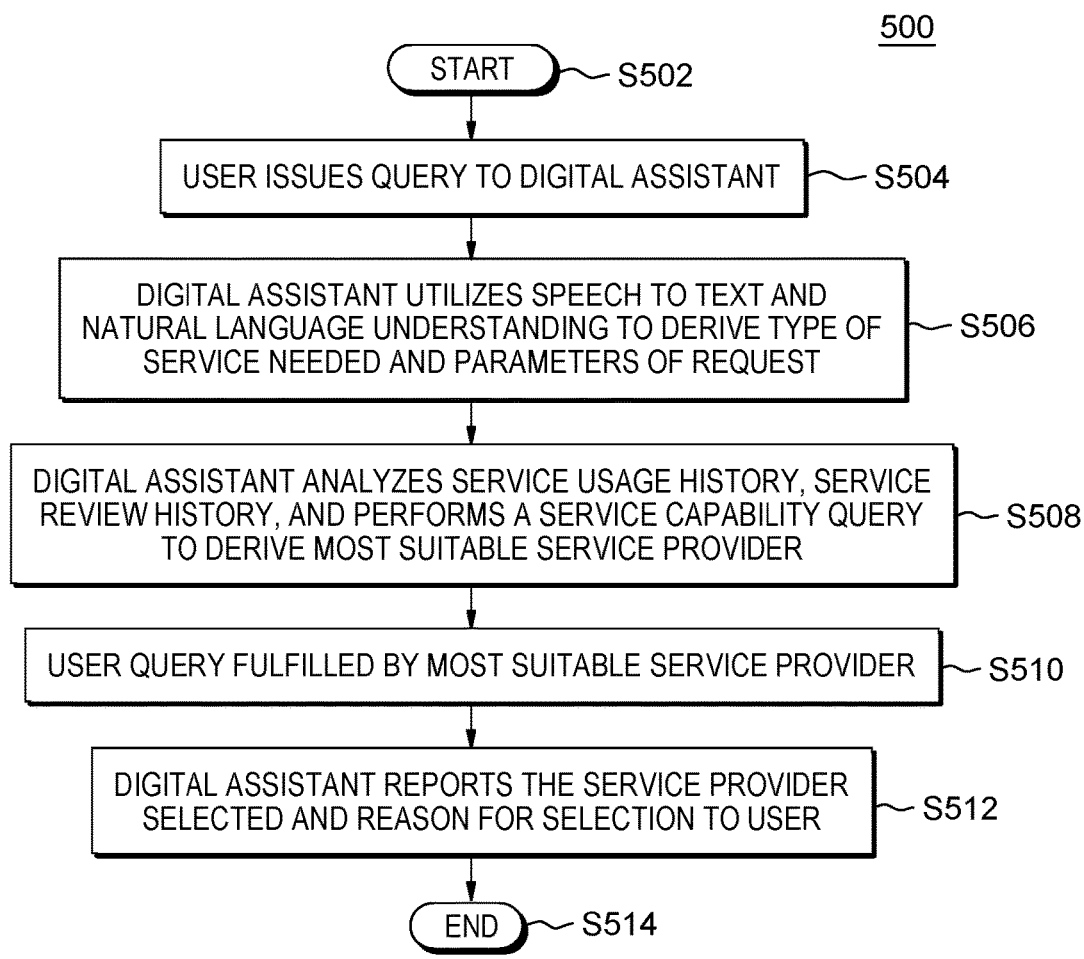
FIG. 5 is a flowchart showing a second embodiment of a method according to the present invention.

FIG. 5 shows flowchart 500 representing an embodiment of a method including the following operation (with flow among and between the operations as shown by arrows in FIG. 5): S5502, S504, S506, S508, S510, S512, and S514.

Figure 6:
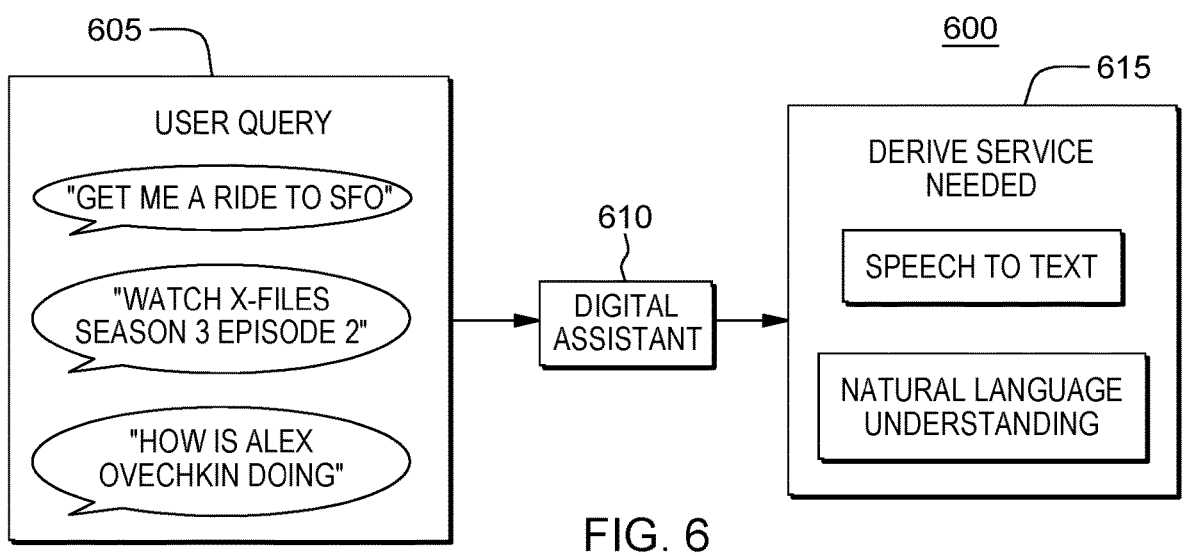
FIG. 6 is a block diagram showing some operations and or components of an embodiment of the present invention.

FIG. 6 shows block diagram 600 including: user query block 605; digital assistant block 610; and derive service needed block 615.

In this embodiment, at stage 1, digital assistant 610 derives a type of services needed to fulfill user query as follows: (i) a user initiates a query 605 to a digital assistant 610 (in some embodiments this request is spoken to the digital assistant (for example "Hey Digital Assistant, get me a ride to SFO"); (ii) digital assistant 610 receives this request and processes it using services 615; and (iii) from this analysis digital assistant 610 derives that the request, in this example, relates to transportation services with the parameters of transportation from the user's current location to SFO airport. To describe item (ii) in more detail, in this example, the services used include a text to speech service that creates a transcript of the user request, and further includes Natural Language Understanding, which service analyzes text to extract metadata from content such as concepts, entities, keywords, categories, sentiment, emotion, relations, and semantic roles. This classifies what the request is for. In this case, the classifications are as follows: transportation, SFO airport.

Figure 7:
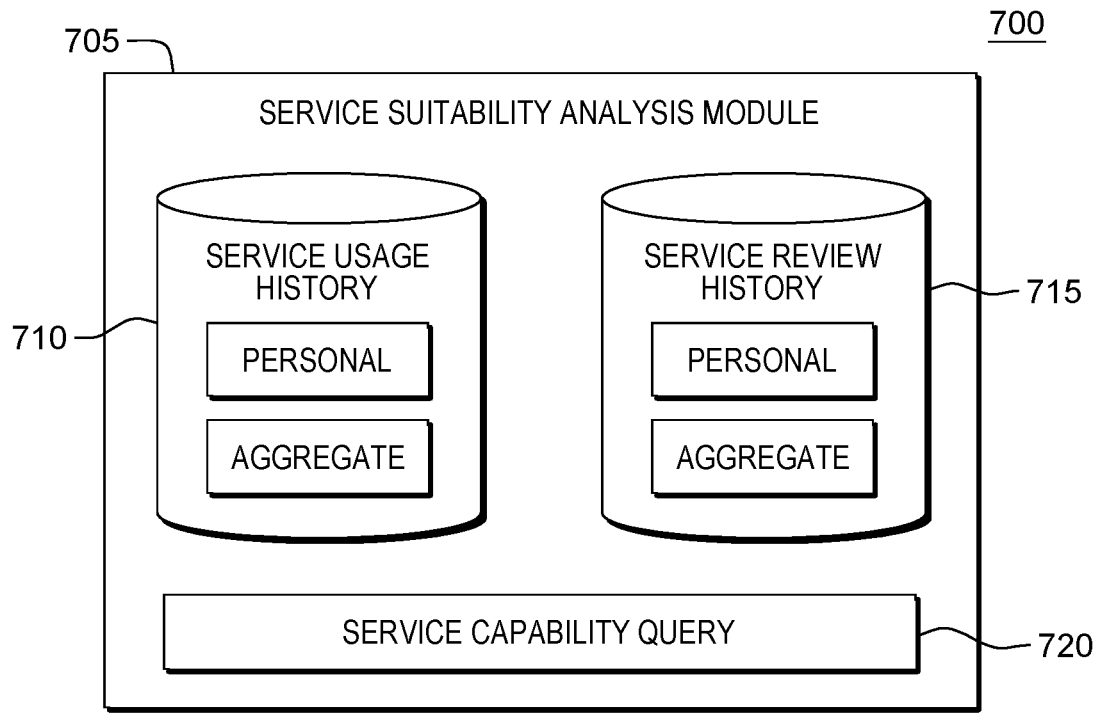
FIG. 7 is a block diagram showing some operations and or components of an embodiment of the present invention.

Block diagram 700 of FIG. 7 shows service suitability module 705 which includes: service usage history data store 710; service review history data store 715; and service capability query 720. In this example, service suitability module 705 is included in digital assistant 610 and represents machine logic used to derive the type of services needed to fulfill the user query.

In this embodiment, at stage 2, service suitability is derived to fulfill the user query from available service providers. With the type of service established (transportation) and the parameters extracted (current location to SFO airport) the digital assistant utilizes service suitability analysis module 705 to derive the best service provider to fulfill the request. Service usage history data store 710 derives which services have been used to fulfill requests like this in the past. As respectively discussed in the following two paragraphs, two repositories within service usage history data store 710 are analyzed in this example.

A personal usage history repository is used to determine which services has the user issuing the query used in the past to fulfill this request. This includes services previously selected by the digital assistant, but also services used by the user in other contexts, such as times they have manually selected to use the service through a web site or mobile app. This history also retrieves existing accounts the user has (for example that the user has created an account with both TransportProviderA and TransportProviderB).

An aggregate usage history repository is used to determine which services have fulfilled this request for other users. The system can search all users on aggregate ("which is the most popular service for watching Abel's Variety Hour Television Show?"), a subset of aggregate users that match a user's situation ("which transportation service is best in this location for getting to SFO?"), or a subset of aggregate users that are in a user's social circle, such as social network connections, family, and friends ("which sports web site do my friends use for NHL news?").

Service review history data store 715 derives the reception a particular service provider received when fulfilling a prior request. Two repositories are analyzed as will be respectively discussed in the following two paragraphs.

A personal review history repository is used to determine how the user rated a particular service the previous times they used it.

Aggregate review history repository is used to determine how other users rate a particular service. Again, this can consider an aggregate of all reviews ("what did everyone think?"), a subset of aggregate users that match a user's situation ("what did other people who travelled to SFO think?") or a subset of aggregate users that are in a user's social circle ("what do my friends think?").

The most suitable service providers (as measured by usage history and review history) are queried by the digital assistant to derive their capabilities by service capability query 720. In this example, preferences are given to services that the user already has an account for (for example, ignore a given service provider if the user doesn't have an account and the video is protected by a paywall) and services that are highly rated to fulfill the given request. Examples of such queries include: (i) what is the fare time and pickup time for a trip to SFO?; and (ii) what image resolution is a given television show episode available in?

Figure 8:
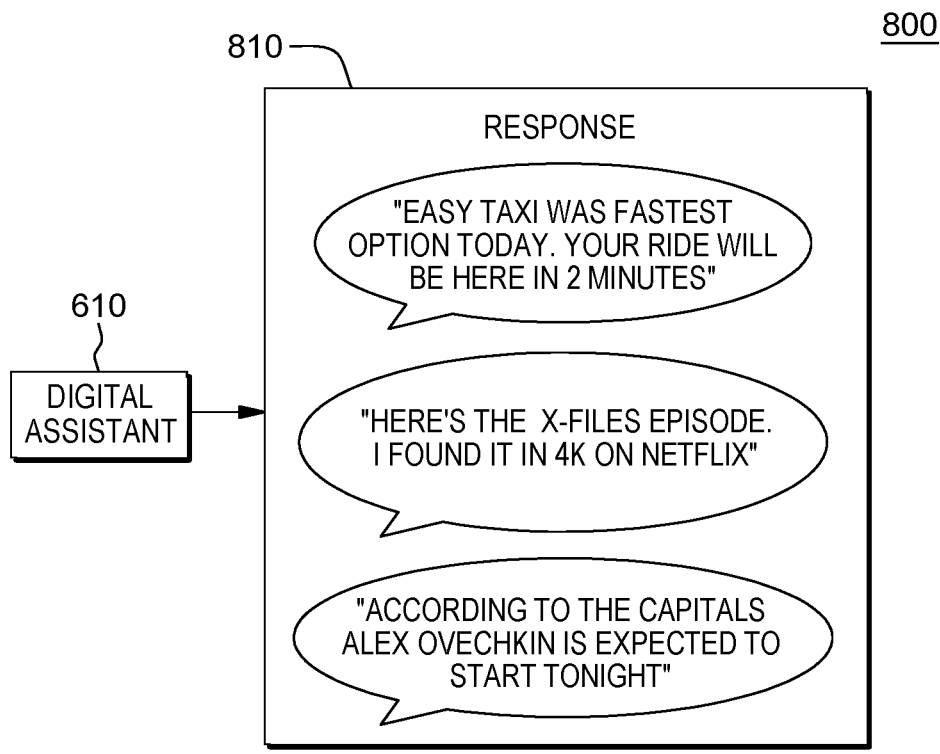
FIG. 8 is a block diagram showing some operations and or components of an embodiment of the present invention.

FIG. 8 shows block diagram 800, which includes digital assistant 610 and response block 810. As shown in diagram 800, digital assistant 610 responds with service provider selected and reason for selection. More specifically, at stage 3, the user query is fulfilled by most suitable service provider as follows: (i) the service that best meets the user's needs, as derived in stage 2, is selected by the digital assistant to fulfill the user query; and (ii) user query block 605 provides response 810 to the user query. In this example, response 810 includes: (i) the name of the service provider selected to fulfill the request; and (ii) the reason the service provider was selected.

Some embodiments of the present invention may include one, or more, of the following operations, features, characteristics and/or advantages: (i) addresses a problem where a generalized digital assistant must delegate tasks to the most suitable service provider; and/or (ii) personalization of service provider can be selected based upon contextual factors. With respect to item (ii), consider the request: "Watch Abel's Variety Hour Television Show Episode 6 Season 3". There are factors that influence the decision of which service provider should fulfill the request. For example: (i) Provider A offers the video at HD resolution; and (ii) Provider B offers the video at 4K resolution. The user has subscriptions to both providers. In some situations, the user may refer the higher resolution version—for example when at home on their home internet connection using a 4K device. At other times the user may prefer the lower resolution version. For example, when watching on a mobile device that does not support 4K and is using cellular data. The system can consider these preferences and dynamically pick the most appropriate service.

Some embodiments of the present invention may include one, or more, of the following operations, features, characteristics and/or advantages: (i) a digital assistant on a mobile device configured to evaluate competing service providers on behalf of a user; (ii) receiving from the user a service request for a specific type of service (for example, transportation to airport, streaming video); (iii) identifying, responsive to the receipt of the request, a plurality of competing service providers capable of fulfilling the service request; (iv) analyzing contextual data, including current user information and historical user preference information, to generate personalized parameters (for example, goals, preferences) for the user (for example, the user values speed over cost in transportation); (v) querying, based on the personalized parameters, each of the service providers; (vi) determining, based on responses to the queries, that one of the service providers is most suitable for fulfilling the current service request; and/or (vii) engaging, based on the determination, the most suitable service on behalf of the user.

Some embodiments of the present invention may include one, or more, of the following operations, features, characteristics and/or advantages: (i) uses personal user history (services a user has manually selected in the past); (ii) aggregate user history (services that are most often selected with others who share the same contextual parameters); (iii) personal review history (services that a user have rated with similar contextual parameters); (iv) aggregate review history (services that other users with similar contextual parameters have rated); (v) analyzes user queries issued to a digital assistant to derive the most appropriate service to fulfill the request based upon personal and aggregate usage history, personal and aggregate review history, and service capabilities for the given query; and/or (vi) a digital assistant that selects the most suitable service provider to fulfill a user query and informs the user of the service selected and reason for selection.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer implemented method (CIM) comprising:
receiving a third party services data set including information indicative of: (i) identities of a plurality of online providers of services of a first type, and (ii) for each given online provider of the plurality of online providers, information relating to how the given online provider provides services of the first type, with the services of the first type being the streaming of video presentations;
receiving, by a digital assistant and from a first user, a first query requesting services of the first type, with the request including information specifying a first streaming video presentation that the first user wants to view and an identity of a viewing device through which the first user wants to view the first streaming video presentation;
responsive to the receipt of the first query, selecting, by machine logic, a selected online provider from the plurality of online providers based, at least in part, on compatibility between a resolution of the first video streaming presentation as offered by the selected online provider and the viewing device; and
taking, by machine logic, an action that facilitates provision of services of the first type by the selected online provider and to the first user.

2. A computer program product (CPP) comprising:
a set of storage device(s); and
computer code stored collectively in the set of storage device(s), with the computer code including data and instructions to cause a processor(s) set to perform at least the following operations:
receiving a third party services data set including information indicative of: (i) identities of a plurality of online providers of services of a first type, and (ii) for each given online provider of the plurality of online providers, information relating to how the given online provider provides services of the first type, with the services of the first type being the streaming of video presentations,
receiving, by a digital assistant and from a first user, a first query requesting services of the first type, with the request including information specifying a first streaming video presentation that the first user wants to view and an identity of a viewing device through which the first user wants to view the first streaming video presentation,
responsive to the receipt of the first query, selecting, by machine logic, a selected online provider from the plurality of online providers based, at least in part, on compatibility between a resolution of the first video streaming presentation as offered by the selected online provider and the viewing device, and
taking, by machine logic, an action that facilitates provision of services of the first type by the selected online provider and to the first user.

3. A computer system (CS) comprising:
a processor(s) set;
a set of storage device(s); and
computer code stored collectively in the set of storage device(s), with the computer code including data and instructions to cause the processor(s) set to perform at least the following operations:
receiving a third party services data set including information indicative of: (i) identities of a plurality of online providers of services of a first type, and (ii) for each given online provider of the plurality of online providers, information relating to how the given online provider provides services of the first type, with the services of the first type being the streaming of video presentations,
receiving, by a digital assistant and from a first user, a first query requesting services of the first type, with the request including information specifying a first streaming video presentation that the first user wants to view and an identity of a viewing device through which the first user wants to view the first streaming video presentation,
responsive to the receipt of the first query, selecting, by machine logic, a selected online provider from the plurality of online providers based, at least in part, on compatibility between a resolution of the first video streaming presentation as offered by the selected online provider and the viewing device, and
taking, by machine logic, an action that facilitates provision of services of the first type by the selected online provider and to the first user.

* * * * *